US007418626B2

(12) United States Patent
Aino et al.

(10) Patent No.: US 7,418,626 B2
(45) Date of Patent: Aug. 26, 2008

(54) INFORMATION PROCESSING APPARATUS

(75) Inventors: Shigeyuki Aino, Tokyo (JP); Shigeo Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 507 days.

(21) Appl. No.: 10/612,929

(22) Filed: Jul. 7, 2003

(65) Prior Publication Data

US 2004/0153750 A1    Aug. 5, 2004

(30) Foreign Application Priority Data

Jul. 11, 2002    (JP)    ............................. 2002-202558

(51) Int. Cl.
 *G06F 11/00*    (2006.01)
(52) U.S. Cl. ...................................... 714/12
(58) Field of Classification Search .................. 714/11, 714/12
See application file for complete search history.

(56) References Cited

U.S. PATENT DOCUMENTS

| 4,823,256 | A | * | 4/1989 | Bishop et al. ................. 714/10 |
| 5,091,847 | A | * | 2/1992 | Herbermann ................. 714/3 |
| 5,155,845 | A | * | 10/1992 | Beal et al. ........................ 714/6 |
| 5,287,484 | A | * | 2/1994 | Nishii et al. ................. 711/144 |
| 5,295,258 | A | * | 3/1994 | Jewett et al. ................. 714/12 |
| 5,317,726 | A | * | 5/1994 | Horst ............................ 714/12 |
| 5,398,331 | A | * | 3/1995 | Huang et al. ................. 714/12 |
| 5,574,849 | A | * | 11/1996 | Sonnier et al. ................. 714/12 |
| 5,751,932 | A | * | 5/1998 | Horst et al. .................... 714/12 |
| 5,751,955 | A | * | 5/1998 | Sonnier et al. ................. 714/12 |
| 5,838,894 | A | * | 11/1998 | Horst ............................ 714/11 |
| 5,953,742 | A | * | 9/1999 | Williams ..................... 711/154 |
| 6,233,702 | B1 | * | 5/2001 | Horst et al. .................... 714/48 |
| 6,389,554 | B1 | * | 5/2002 | Jung et al. ...................... 714/6 |
| 7,003,691 | B2 | * | 2/2006 | Safford et al. ................. 714/11 |
| 2002/0065996 | A1 | | 5/2002 | Garnett et al. |
| 2004/0225946 | A1 | * | 11/2004 | Hashimoto et al. .......... 714/764 |
| 2006/0150006 | A1 | * | 7/2006 | Mizutani ..................... 714/11 |
| 2006/0150010 | A1 | * | 7/2006 | Stiffler et al. ................. 714/13 |
| 2008/0005614 | A1 | * | 1/2008 | Lubbers et al. ............... 714/11 |

FOREIGN PATENT DOCUMENTS

| EP | 0 411 805 B1 | 10/1996 |
| EP | 0 757 315 A2 | 2/1997 |
| JP | 3-219333 A | 9/1991 |
| WO | WO 00/60463 A1 | 10/2000 |

* cited by examiner

*Primary Examiner*—Robert W Beausoliel, Jr.
*Assistant Examiner*—Elmira Mehrmanesh
(74) *Attorney, Agent, or Firm*—Sughrue Mion, PLLC

(57) ABSTRACT

An information processing apparatus of the present invention includes first and second computer elements which execute the same instructions substantially simultaneously and which are substantially synchronized with each other. The first computer element includes first and second memory elements, which are written by the first and second computer elements, respectively, during a first state. The information processing apparatus has a control element which makes the first computer element read from the second memory element during a second state. Another information processing apparatus has the first and second computer elements, and first and second memory areas which are provided in the first computer element. The first and second memory areas are written by the first computer element and the second computer element, respectively, during a first state. A control element makes the first computer element read from the second memory area during a second state.

5 Claims, 7 Drawing Sheets

INFORMATION PROCESSING APPARATUS

BACKGROUND OF THE INVENTION

The present invention relates to an information processing apparatus, such as a lockstep fault tolerant computer, that simultaneously processes the same instructions in a plurality of clock-synchronized computer modules therein, and more particularly, to an information processing apparatus that speedily synchronizes a computer module, which has been out of synchronism with the other computer modules and isolated from the operation, with other computer modules.

A conventional lockstep fault tolerant computer has a plurality of computer modules which simultaneously execute the same instructions. In the fault tolerant computer, one of the computer modules may operate differently from the other computer modules because of a failure or some other causes. Upon detecting a computer module that operates differently from the other computer modules, in other words, on finding a computer module which is out of lockstep synchronism, the lockstep fault tolerant computer once puts the detected computer module out of the operation.

Causes which make the computer module be out of the lockstep synchronism vary. A course of reaction to be taken for the computer module, which is out of the lockstep synchronism, depends on the cause. One of the causes, which makes the computer module be out of the lockstep synchronism, may be a permanent failure that occurs within the computer module. The permanent failure is not a temporary disturbance or a failure that recovers by the computer module itself, but a failure requiring repairs. A computer module, in which a permanent failure occurs, is usually taken out of the lockstep fault tolerant computer and, instead of that module, another healthy computer module is installed.

Another potential cause, which makes the computer module be out of the lockstep synchronism, may be a lack of synchronism that the operation timing does not synchronize temporarily with the other computer modules because of manufacturing variations of the computer modules. Yet another potential cause may be temporary malfunction of a memory in the computer module affected by an influence such as an a ray. In those causes like a lack of synchronism or temporary malfunction, which does not cause a permanent failure, the computer module need not be replaced.

If the permanent failure occurs, the faulty computer module is replaced and the replaced computer module is joined to and synchronized with the other computer modules. If there is no permanent failure, the computer module is rejoined to and resynchronized with the other computer modules. The operation to make a disconnected computer module rejoin the other computer modules is a resynchronization. When the conventional lockstep fault tolerant computer resynchronizes with the computer module which was out of the lock step synchronism, the conventional lockstep fault tolerant computer copies a memory of the computer module, which is to be rejoined, from a memory of another computer module which is in the lockstep synchronism. There joined computer module there after executes the same operations with the other computer modules.

A conventional lockstep fault tolerant computer forces all computing modules stop and copies the whole contents of memory of the joined or rejoined computer module from another computer module being in the lockstep synchronism when joining or rejoining the computing module. This allows all the computing modules to have completely the same internal state. A conventional lockstep fault tolerant computer is forced to stop long time to join or rejoin the computer module. This is because it takes a long time to copy the whole contents of the memory in the computer module. Especially, as memory size in the computer module increases, time to copy the whole content of the memory in the computer module increases.

SUMMARY OF THE INVENTION

An object of the present invention is to provide an information processing apparatus that ameliorates availability.

Another object of the invention is to provide an information processing apparatus that quickly resume operation after the detection of a failure.

According to one aspect of the present invention, an information processing apparatus is provided which includes: first and second computer elements which execute the same instructions substantially simultaneously and which are substantially synchronized with each other; a first memory element which is provided in the first computer element and which is read and written by the first computer element during a first state; a second memory element which is provided in the first computer element and which is written by the second computer element during the first state; and a control element which makes the first computer element read from the second memory element during a second state.

According to another aspect of the present invention, an information processing apparatus is provided which includes: first and second computer elements which execute the same instructions substantially simultaneously and which are substantially synchronized with each other; a first memory area which is provided in the first computer element and which is read and written by the first computer element during a first state; a second memory area which is provided in the first computer element and which is written by the second computer element during the first state; and a control element which makes the first computer element read from the second memory area during a second state.

BRIEF DESCRIPTION OF THE DRAWINGS

Other features and advantages of the invention will be made more apparent by the following detailed description and the accompanying drawings, wherein.

In the drawings, the same reference numerals represent the same structural elements.

DETAILED DESCRIPTION OF THE PREFERRED EMBODIMENTS

As described in the prior art, a cause that puts a computer module out of lockstep synchronism is a permanent failure or a non-permanent failure. In a fault tolerant computer, a computer module in which the permanent failure is occurred must be replaced. On the other hand, if a computer module is out of the lockstep synchronism because of a non-permanent failure, it is usually not replaced but installed unchanged. Namely, in considerable cases, a computer module, which is out of the lockstep synchronism, rejoins a fault tolerant computer.

An object of the present invention is to reduce the out-of-service time of a lockstep fault tolerant computer when a computer module which was out of lockstep synchronism is rejoined without being replaced.

An embodiment of the present invention will be described in detail below.

Figure 1:
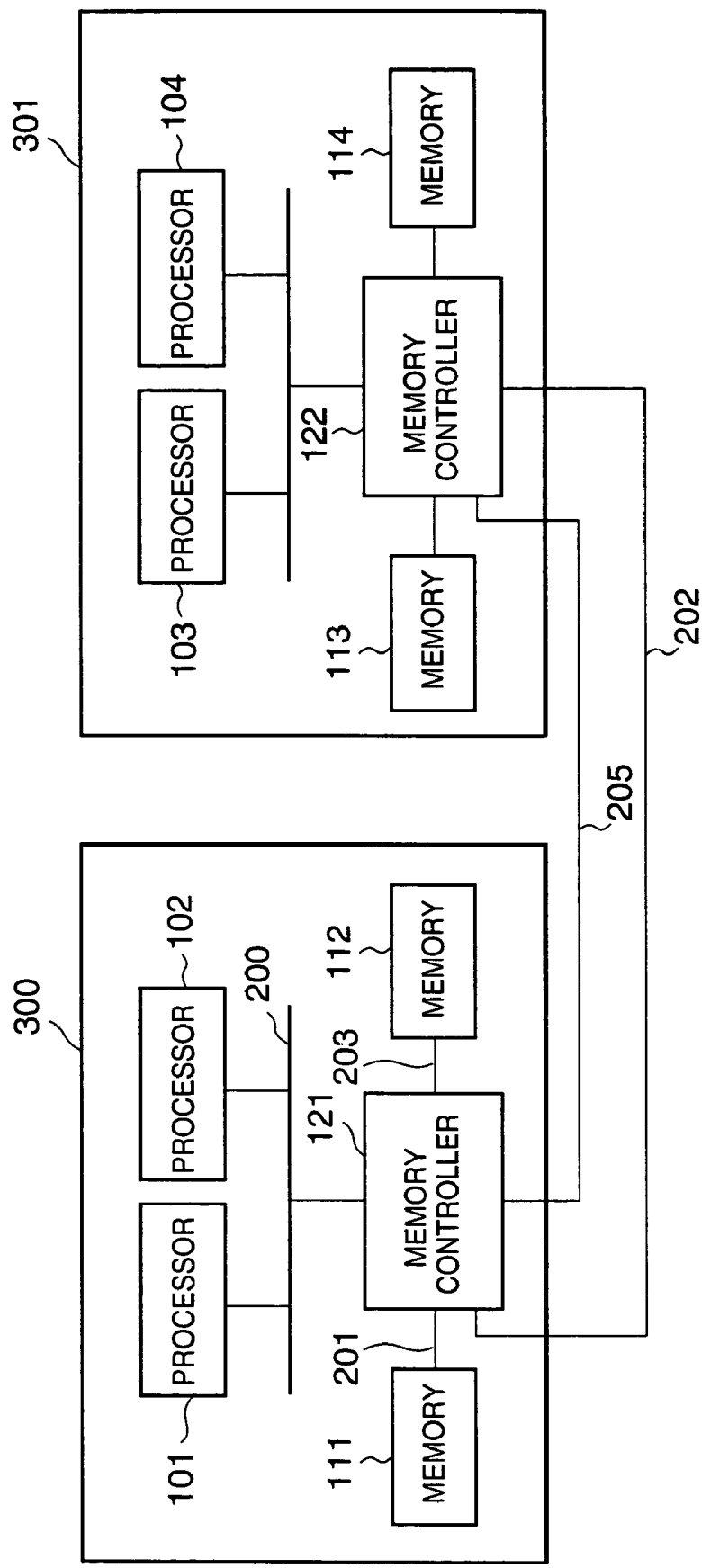
FIG. 1 is a block diagram of an embodiment of the present invention.

Referring to FIG. 1, an information processing apparatus includes computer modules 300 and 301. In this embodiment the information processing apparatus is a lockstep fault tolerant computer. The computer module 300 and the computer module 301 have the same or a equivalent configuration or structure. The computer module 300 includes processors 101 and 102, memories 111 and 112, and a memory controller 121. The processor 101 and the processor 102 have the same configuration and share a bus 200. The memory controller 121 is connected to the bus 200 of the processors 101 and 102. The memory 111 and the memory 112 have the same configuration. The memory 111 is connected to the memory controller 121 via a signal line 201. The memory 112 is connected to the memory controller 121 via a signal line 203.

Like the computer module 300, the computer module 301 includes processors 103 and 104, memories 113 and 114, and a memory controller 122. The processors 103 and 104 are the same as the processors 101 and 102 of the computer module 300. The memory controller 122 is the same as the memory controller 121 of the computer module 300. The memories 113 and 114 are the same as the memories 111 and 112 of the computer module 300.

The memory controller 121 of the computer module 300 and the memory controller 122 of the computer module 301 are connected via signal lines 202 and 205.

Next, a first embodiment of the present invention will be described in more detail below by focusing the computer module 300 as an example.

The processors 101 and 102 execute instructions instructed by the lockstep fault tolerant computer. The instruction execution by processors 101 and 102 is substantially synchronized with that by the processors 103 and 104 of computer module 301 based on an identical or substantially the same clock signal, and processors 101 and 102 execute the same or substantially the same instructions substantially simultaneously with the processors 103 and 104 of computer module 301. The source of the clock signal is provided commonly for the all computer modules 100, 200 and 300, or the sources of the clock signals, which are synchronized, are provided for computer modules 100, 200 and 300, respectively. Namely, computer modules 300 and 301 execute the instructions in "lockstep" synchronism in which every computer modules 300 and 301 execute a substantial identical instruction stream substantially simultaneously. During the instruction execution, processors 101 and 102 write data into or read data from memory.

The memory controller 121 switches between memory access requests from the processor 101, memory access requests from the processor 102 and memory access requests from the computer module 301 received via the signal line 205, and sends the requests to the appropriate memories 111 and 112. In addition, the memory controller 121 receives a response to a memory access request from the memories 111 or 112 and sends the response to the processors 101 and 102. A request is sent from the processors 101 or 102 to one of or both of the memories 111 and 112 when the request is a write access request or a read access request. A write access request includes write data. A response is sent from the memory to the processor when the request is a read access request. The response includes read data.

Figure 2:
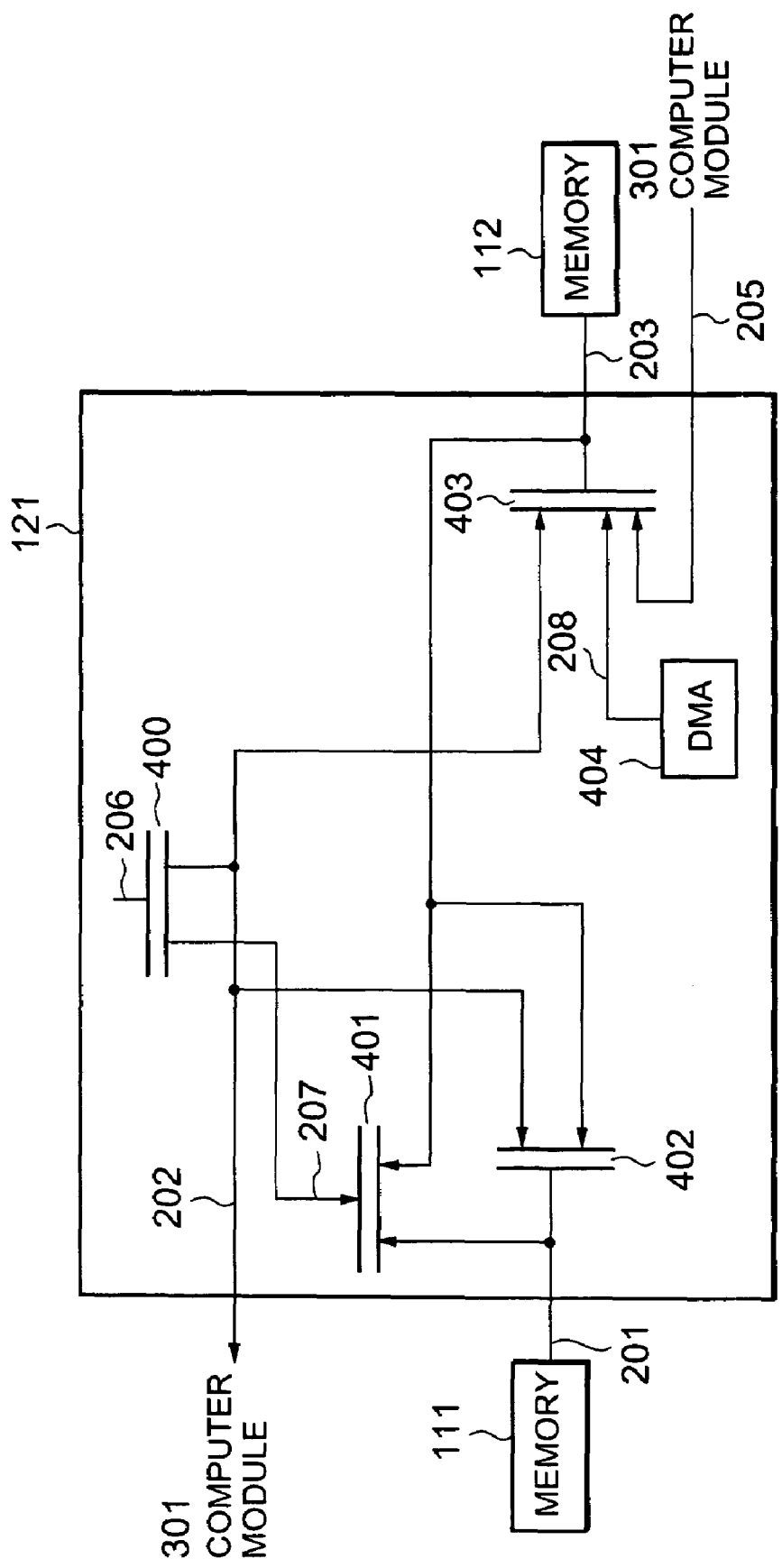
FIG. 2 is a block diagram of a memory controller in an embodiment of the present invention.

Referring to FIG. 2, the memory controller 121 includes switching circuits 400, 401, 402, and 403 and a direct memory access (DMA) circuit 404. The switching circuit 400 connects a signal line 207 to a signal line 206 and sends a response to the signal line 206 when the response is received from one of the memories 111 and 112. The signal line 206 is a signal line one of or identical to the bus 200, and the response is sent to the processors 101 and 102. The switching circuit 400 connects the signal line 206 to the signal line 202 when the request is sent from the processors 101 and 102 to one of or both of the memories. The switching circuit 400 selects one signal line out of the signal lines 202 and 207, and connects it to the signal line 206.

The switching circuit 401 connects the signal line 203 to the signal line 207 to select the response received from the memory 112, when a response is received from the memory 112 during a rejoining process. The switching circuit 401 connects the signal line 201 to the signal line 207 to select a response received from the memory 111 when the response is received from the memory 111 during a normal process. The term "normal process" is the state in which the computer module 300 is operating in synchronization with the other computer module 301. The term "during a rejoining process" is the state in which a rejoining process started by the computer module 300 is not yet finished.

The switching circuit 402 selects one signal line out of the signal lines 202 and 203, and connects it to the signal line 201. The switching circuit 402 connects the signal line 202 to the signal line 201 to send a request to the memory 111, whenever the request is received from the processors 101 and 102 via the signal line 202. The switching circuit 402 connects the signal line 203 to the signal line 201 to send a request to the memory 111, when a write access request is received in the DMA transfer (copy) mode via the signal line 203 during rejoining process.

The switching circuit 403 selects one of the signal lines 202, 205 and 208, and connects it to the signal line 203. The switching circuit 403 connects the signal line 202 to the signal line 203 to send a request to the memory 112, when the request is received via the signal line 202 during rejoining process. The switching circuit 403 connects the signal line 205 to the signal line 203 to send a request to the memory 112, when the request is received from the computer module 301 via the signal line 205 during the normal process. The switching circuit 403 connects the signal line 208 to the signal line 203 to send a read access request from the DMA circuit 404 to the memory 112 in the DMA transfer (copy), when the rejoining process is being executed and no request is received from the signal line 202.

The DMA circuit 404 transfers data from the memory 112 to the memory 111 via the signal line 208 in the DMA transfer mode, when rejoining process is being executed and no request is received from the signal line 202. During the DMA transfer, the DMA circuit 404 reads data sequentially from all memory areas in the memory 112 and writes the data into the memory 111. If a request is sent from the processors 101 and 102 to the memories 111 and 112 via the signal line 202 during the DMA transfer, the DMA circuit 404 suspends the DMA transfer.

Next, the operation of a lockstep fault tolerant computer in this embodiment during the normal process will be described in detail. During the normal operation, all computer modules 300 and 301 execute the same or substantially the same operation.

First, the operation in response to a read access request during the normal process will be described.

Figure 3:
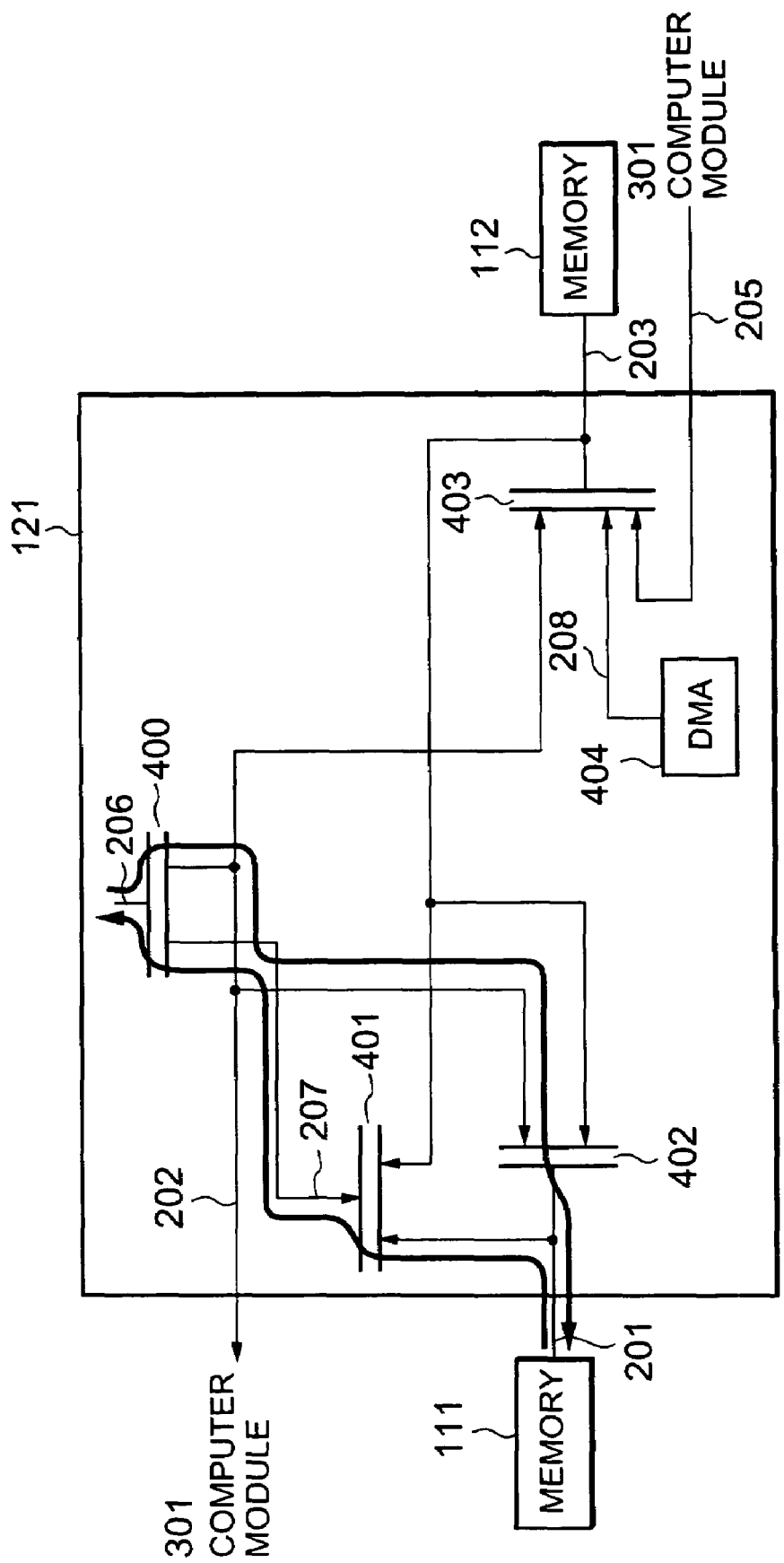
FIG. 3 is a diagram showing the operation of a computer module in response to a read access request during normal process.

Referring to FIG. 3. a read access request from the processors 101 and 102 is sent to the switching circuit 400 via the signal line 206, that is, the bus 200. The request from the signal line 206 is sent to the signal line 202 by routing of the switching circuit 400. The request is sent to the computer module 301 via the signal line 202. This request reaches the memory 114, but the switching circuit in the computer module 301 stops the response from the memory 114. The request is sent also to the switching circuit 403 via the signal line 202, but stops there and does not reach the memory 112 because the switching circuit 403 does not connect the signal line 202 and the signal line 203. The request is sent also to the switching circuit 402 via the signal line 202. The request is sent to the signal line 201 by routing of the switching circuit 402 and reaches the memory 111. The request also reaches the switching circuit 401 via the signal line 201 but stops there because the switching circuit 401 does not connect the signal line 201 and the signal line 207.

A response, which includes data read from the memory 111 in response to the request from the processors 101 and 102, is sent to the switching circuit 401 via the signal line 201. The response from the memory 111 is sent to the signal line 207 by routing of the switching circuit 401 and reaches the switching circuit 400. The response, which includes the read data, is sent to the signal line 206 by routing of the switching circuit 400 and reaches the processors 101 and 102. In this way, data is read from the memory 111 during normal processing as shown in FIG. 3.

Next, the operation in response to a write access request during the normal process will be described.

Figure 4:
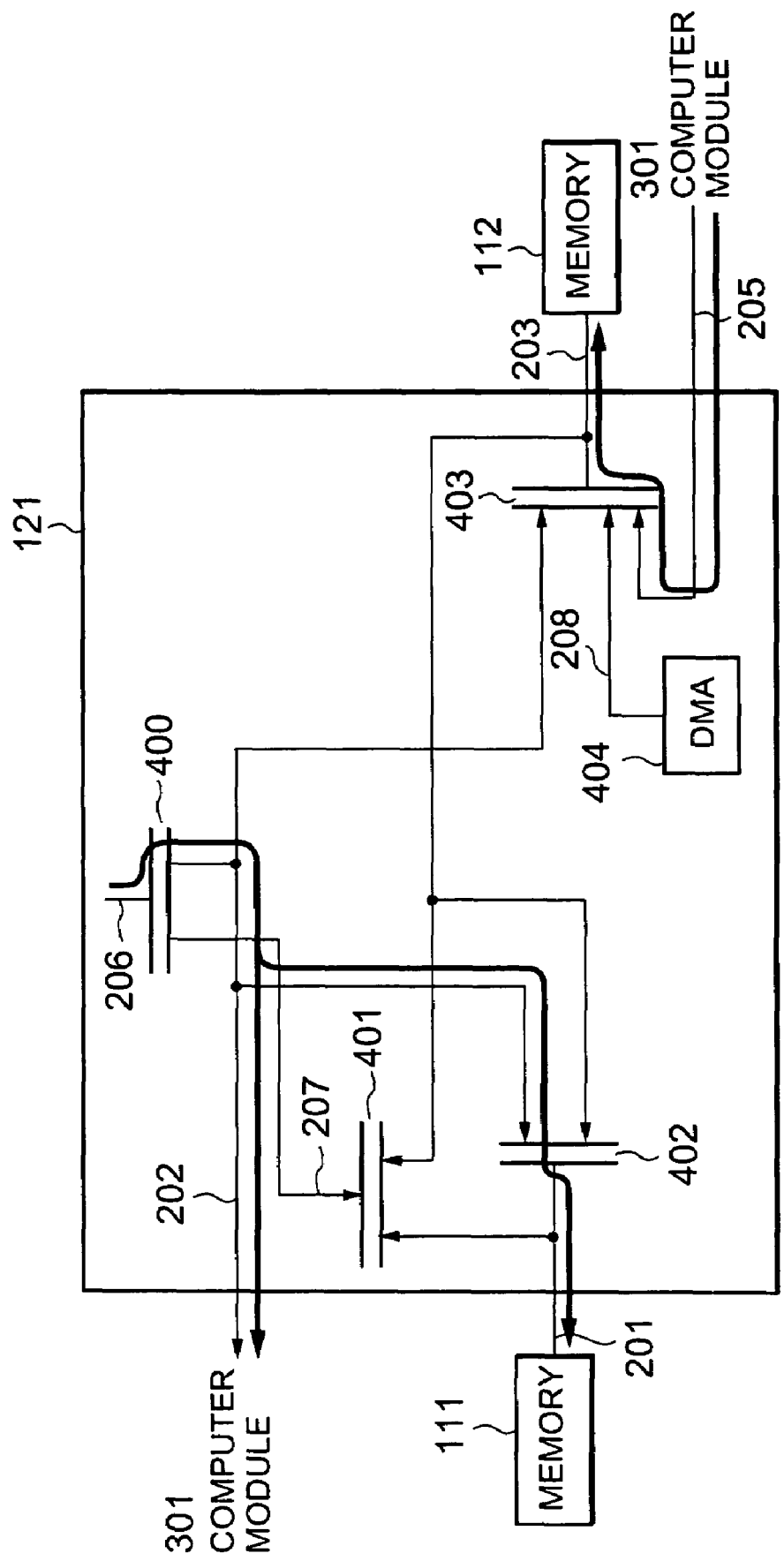
FIG. 4 is a diagram showing the operation of a computer module in response to a write access request during normal process.

In FIG. 4, write access requests from the processors 101 and 102 are sent to the switching circuit 400 via the signal line 206, that is, the bus 200. The request from the signal line 206 is sent to the signal line 202 by routing of the switching circuit 400. The request is sent to the computer module 301 via the signal line 202. This request reaches the memory 114 of the computer module 301. Data is then written in the memory 114. The request is sent also to the switching circuit 403 via the signal line 202, but stops there and does not reach the memory 112 because the switching circuit 403 does not connect the signal line 202 and the signal line 203. The request is sent also to the switching circuit 402 via the signal line 202. The request is sent to the signal line 201 by routing of the switching circuit 402 and reaches the memory 111. Data is then written in the memory 111.

In this way, data is written in the memory 111 during the normal process as shown in FIG. 4. Although not shown, the same data is written in the memory 114 of the computer module 301 through the signal 206, the switching circuit 400 and the signal line 202 by the processors 101 and 102. In addition, because the processors 103 and 104 of the computer module 301 execute the same operation as that of the processors 101 and 102, the same data is written also in the memory 112 through the signal line 205, the switching circuit 403 and the signal line 203 as shown in FIG. 4.

Next, the operation of the lockstep fault tolerant computer in this embodiment from the time a computer module is found to be out of the lockstep synchronism to the time the rejoining process is completed, including the duration of the rejoining process.

When a computer module is found to be out of the lockstep synchronism, the lockstep fault tolerant computer once stops all computer modules 300 and 301. Then, the lockstep fault tolerant computer stores the context of a process or processes, which are being executed in the processors 101, 102, 103, and 104 at that time, into the memory.

Subsequently, the lockstep fault tolerant computer loads the context of the process or the processes, which is stored in the memory, to the processors of all computer modules. The computer module that is not out of lockstep synchronism then restarts the normal process. The computer module that is out of lockstep synchronism starts the rejoining process.

Next, the operation of a computer module during the rejoining process will be described. Assume that the computer module 300 is the computer module which is out of lockstep synchronism.

Firstly, the operation of the computer module in response to a read access request during the rejoining process will be described below.

Figure 5:
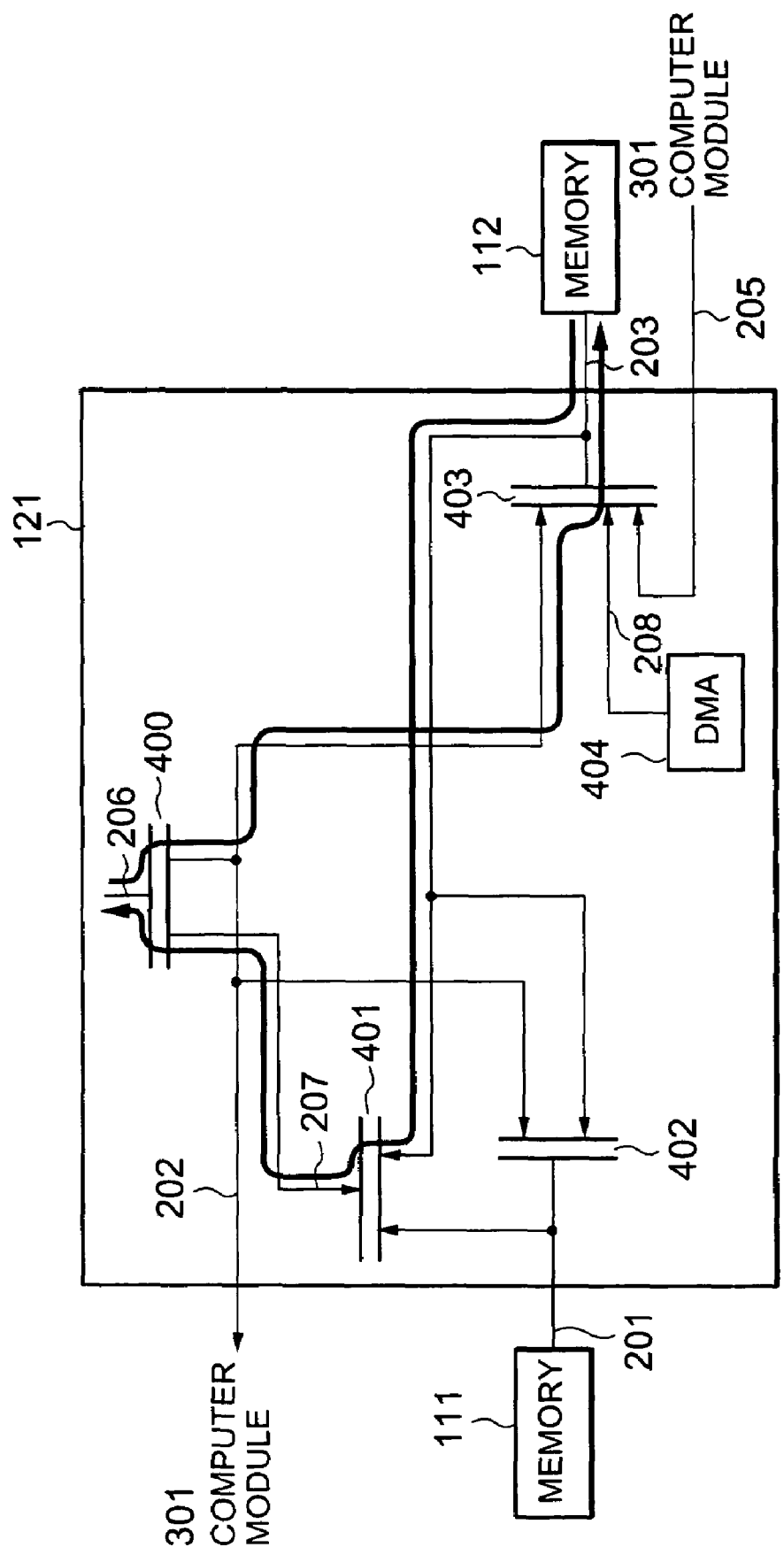
FIG. 5 is a diagram showing the operation of a computer module in response to a read access request during rejoining process.

Referring to FIG. 5, a read access request issued by the processors 101 and 102 is sent to the switching circuit 400 via the signal line 206, that is, the bus 200. The request from the signal line 206 is sent to the signal line 202 by routing of the switching circuit 400. The request is sent to the computer module 301 via the signal line 202. This request reaches the memory 114, but the switching circuit in the computer module 301 stops a response from the memory 114. The request is sent also to the switching circuit 402 via the signal line 202. The switching circuit 402 connects the signal line 202 to the signal line 201. And, this request reaches the memory 111, but the switching circuit 401 stops the response from the memory 111. The request is sent also to the switching circuit 403 via the signal line 202. This request is sent to the signal line 203 by routing of the switching circuit 403 and reaches the memory 112. A response including data, which is read from the memory 112 by the request issued from the processors 101 and 102, reaches the switching circuit 401 via the signal line 203. This response also reaches the switching circuit 402 but stops there because the switching circuit 402 does not connect the signal line 203 to the signal line 201. This response is sent to the signal line 207 by routing of the switching circuit 401 and reaches the switching circuit 400. This response, which includes data read from the memory 112, is sent to the signal line 206 by routing of the switching circuit 400 and reaches the processors 101 and 102. In this way, data is read from the memory 112 during the rejoining process as shown in FIG. 5.

Secondly, the operation of the computer module in response to a write access request during the rejoining process will be described below.

Figure 6:
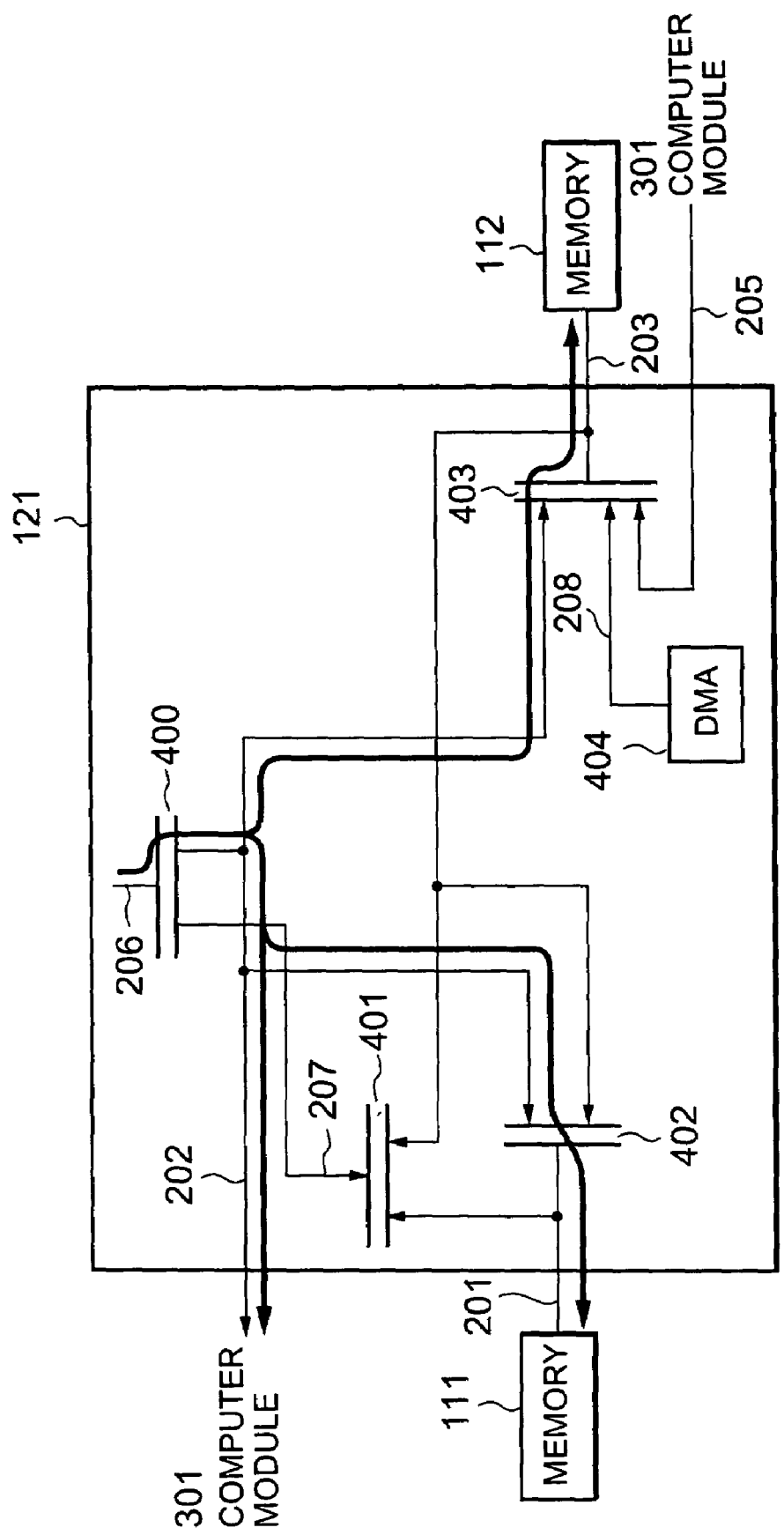
FIG. 6 is a diagram showing the operation of a computer module in response to a write access request during rejoining process.

In FIG. 6, a write access request issued by the processors 101 and 102 is sent to the switching circuit 400 via the signal line 206, that is, the bus 200. The request from the signal line 206 is sent to the signal line 202 by routing of the switching circuit 400. The request is sent to the computer module 301 via the signal line 202. This request reaches the memory 114 in the computer module 301. Data is then written in the memory 114. The request is sent also to the switching circuit 402 via the signal line 202. The request is sent to the signal line 201 by routing of the switching circuit 402 and reaches the memory 111. Data is then written in the memory 111. The request is sent also to the switching circuit 403 via the signal line 202. The request is sent to the signal line 203 by routing of the switching circuit 403 and reaches the memory 112. Data is then written in the memory 112.

In this way, data is written in the memories 111 and 112 during the rejoining process as shown in FIG. 6. Although not shown in the figure, the same data is written also in the memory 114 of the computer module 301 by the processors 101 and 102.

Thirdly, during the rejoining process, the computer module copies the contents of the memory by using the DMA circuit 404 in parallel with the processing of the read access request or the write access request received from the processors 101 and 102 described above.

Figure 7:
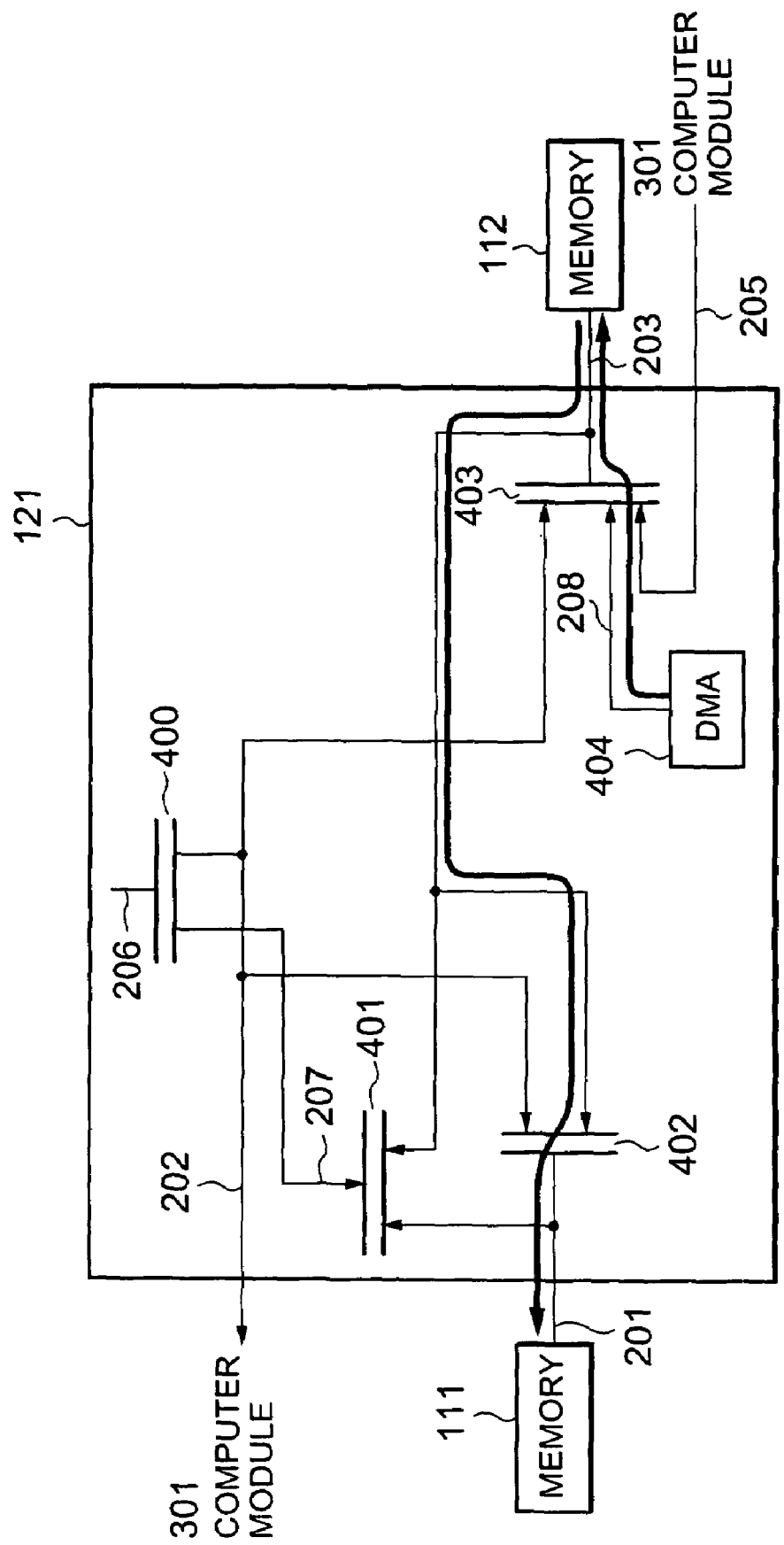
FIG. 7 is a diagram showing the memory copy operation of a computer module during rejoining process.

FIG. 7 is a diagram showing the memory copy operation executed by the computer module during rejoining process.

Upon detecting that no access is made from the signal line 202 to the memory 112 during the rejoining process, the DMA circuit 404 sequentially sends read requests for all the memory areas of the memory 112 to the switching circuit 403 via the signal line 208. Those requests are sent to the signal line 203 by routing of the switching circuit 403 and reach the memory 112. Data is then read sequentially from the memory 112. A response, which includes read data from the memory 112, reaches the switching circuit 401 but stops there because the switching circuit 401 does not connect the signal line 203 to the signal line 207. This response also reaches the switching circuit 402 as write access requests for the memory 111. Those requests are sent to the signal line 201 by routing of the switching circuit 402 and reaches the memory 111. Thus, data read from the memory 112 is written sequentially into the memory 111. The contents of the memory are copied in this way.

If a request is sent from the processors 101 and 102 to the memories 111 and/or 112 via the signal line 202 during the above-described memory copy operation, the lockstep fault tolerant computer suspends the memory copy operation and executes the request received from the processors 101 and/or 102. If the request is a write access request, the same data is written in the memory 111 and the memory 112. Thus, the same data is written in the memories 111 and 112 not only when the memory copy operation is executed but also when a execution result is received from the processors 101 and 102.

When the memory copy operation is completed for all memory areas of the memory, in this embodiment, the memory 112, the lockstep fault tolerant computer changes the state of the computer module 300 to the normal state. Thus the memory 112 is time-shared by the memory copy operation and the execution for the request from the processors 101 and 102 till the memory copy operation finishes.

The computer module, which is out of the lockstep synchronism because of a non-permanent failure, retains the contents of the memories 111 and 112 unless replaced. The contents of the memory 112 have been written by the computer module that is not out of lockstep synchronism. Therefore, like the contents of the memory of the computer module which is not out of lockstep synchronism, the contents of memory 112 must be normal and valid even in the computer module 300 which is out of the lockstep synchronism.

In this embodiment, when putting a computer module, which is out of lockstep synchronism, back into operation directly, the rejoining computer module during the rejoining process can start immediately the execution of instructions using the memory 112 in which data has been written by the other computer module during the normal process. This enables the rejoining computer module to instantly start the same operation as that of the other computer module which are not out of lockstep synchronism. In addition, the computer module during the rejoining process copies the memory in parallel with the execution of instructions. This eliminates necessity for stopping the lockstep fault tolerant computer during the memory copy operation, while such a stop is indispensable for the conventional computer. Therefore, the lockstep fault tolerant computer of the present invention can restart the operation after a short stop time.

Although the lockstep fault tolerant computer in this embodiment has a configuration in which two computer modules 300 and 301 are provided, the present invention is not limited to this configuration. The present invention may be applied to a configuration in which a plurality of computer modules are provided. For three or more computer modules, the memory controllers of the computer modules may be connected as a ring. If a number of computer modules are even, each two modules may form a pair such that the memory controllers of a paired computer modules are interconnected as in the example of this embodiment.

The computer module may have a memory which has a first memory area corresponding to, for example, the memory 111 and a second memory area corresponding to, for example, the memory 112, although the computer module 300 of the above-described embodiment has two memories 111 and 112.

In this embodiment, a lockstep fault tolerant computer is used as an example. However, the present invention is not limited to a lockstep fault tolerant computer. The present invention may be applied to a device including a plurality of circuits each of which contains processors and memories that must have the consistent internal state.

While this invention has been described in conjunction with the preferred embodiments described above, it will now be possible for those skilled in the art to put this invention into practice in various other manners.

What is claimed is:

1. An information processing apparatus comprising:
a first computer module which includes a first controller and a second computer module which includes a second controller, wherein:
said first computer module includes a first processor, a first main-memory and a first sub-memory;
said second computer module includes a second processor, a second main-memory and a second sub-memory;
said first processor and said second processor operate substantially simultaneously and are substantially synchronized with each other;
said first controller writes data to said first main-memory and said second sub-memory according to a first write request of said first processor, and at the substantially same time, said second controller writes data to said second main-memory and said first sub-memory according to a second write request of said second processor;
wherein:
said first and second write requests are associated with the same data;
said first controller controls so that while said first processor and said second processor are synchronized, read access from said first processor is carried out as against said first main-memory and write access from said first processor is carried out as against said first main-memory and said second sub-memory and write access from said second processor is carried out as against said first sub-memory, and said first controller controls so that, when said first processor fails to be in synchronism with said second processor, read access from said first processor is carried out as against said first sub-memory and write access from said first processor is carried out as against said first main-memory, said first sub-memory and said second sub-memory; and said first controller copies the contents of said first sub-memory to said first main-memory when said first processor fails to be in synchronism with said second processor.

2. The information processing apparatus as claimed in claim 1, wherein said first controller copies the contents of said first sub-memory to said first main-memory by means of a direct memory access circuit.

3. The information processing apparatus as claimed in claim 1, wherein said first processor recovers said synchronism with said second processor when said copy is completed for all memory areas of said first sub-memory.

4. The information processing apparatus as claimed in claim 1, wherein said first and second controllers are connected as a ring for three or more other computer modules.

5. The information processing apparatus as claimed in claim 1, wherein said first and second computer modules are on lockstep fault tolerant computer system.

* * * * *